United States Patent [19]

Van Veldhuizen

[11] 4,421,489

[45] Dec. 20, 1983

[54] PROPELLER DRIVEN VEHICLE WITH FORWARD AND REVERSE CONTROL AIR RUDDERS

[76] Inventor: John Van Veldhuizen, 25975 SW. 182nd Ave., Homestead, Fla. 33030

[21] Appl. No.: 255,810

[22] Filed: Apr. 20, 1981

[51] Int. Cl.[3] ............................................. B63H 7/00
[52] U.S. Cl. ..................................... 440/37; 440/43; 114/150; 114/163
[58] Field of Search ............ 180/117; 244/12.5, 23 D; 114/150, 163, 145 A, 145 R; 239/265.29, 265.37, 265.39; 440/37, 43

[56] References Cited

U.S. PATENT DOCUMENTS

| 3,583,520 | 6/1971 | Kirpitznikoff | 180/117 |
| 3,872,817 | 3/1975 | Duryea | 114/163 |
| 4,027,614 | 6/1977 | Jones | 114/163 |

FOREIGN PATENT DOCUMENTS

| 929191 | 6/1973 | Canada | 180/117 |
| 18866 | 1/1956 | Fed. Rep. of Germany | 114/163 |
| 1176513 | 8/1964 | Fed. Rep. of Germany | 114/150 |
| 1475514 | 3/1967 | France | 180/117 |
| 394 | of 1895 | United Kingdom | 114/145 R |
| 1055161 | 1/1967 | United Kingdom | 114/150 |
| 628027 | 9/1978 | U.S.S.R. | 114/150 |

Primary Examiner—Trygve M. Blix
Assistant Examiner—Thomas J. Brahan
Attorney, Agent, or Firm—Harvey B. Jacobson

[57] ABSTRACT

A vehicle is provided to be propelled by a rearward discharge of fluid therefrom and including fluid jet developing structure for discharging a rearward jet of fluid along a predetermined path for propelling the vehicle forwardly. A pair of upstanding steering vanes are mounted for rotation about upstanding axes spaced transversely apart and disposed on opposite sides of the center line of the aforementioned path. Control structure is also provided and operative to simultaneously similarly angularly displace the vanes about their axes of oscillation and the control structure further includes adjustment structure for selectively relatively angularly displacing the vanes about their axes of oscillation. The vanes extend rearwardly of their axes of oscillation distances greater than one-half the distance between the axes of oscillation of the vanes, whereby opposite relative angular displacement of the vanes to forwardly and outwardly inclined positions displaced generally 50° to 60° from front-to-rear extending positions will cause the rear ends of the vanes to swing into close juxtaposed positions.

9 Claims, 8 Drawing Figures

PROPELLER DRIVEN VEHICLE WITH FORWARD AND REVERSE CONTROL AIR RUDDERS

BACKGROUND OF THE INVENTION

Airboats and ground effect vehicles are conventionally propelled by power driven propellers operative in the sense of an airplane propeller and steerage of airboats and ground effect vehicles is often accomplished through the utilization of steering vanes or rudders of generally conventional design. However, when these steering vanes or rudders are utilized, precise maneuvering control, braking and reverse movement of airboats and ground effect vehicles is difficult or substantially impossible. Accordingly, many different forms of sophisticated air ducting and jet systems heretofore have been designed to enable airboats and ground effect vehicles to be precisely maneuvered, braked and operated in reverse. However, these sophisticated systems are expensive and subject to malfunction. Accordingly, a need exists for a steering control of the steering vane or rudder-type which may be utilized in conjunction with an airboat or ground effect vehicle and which will enable an airboat or ground effect vehicle to be precisely maneuvered, braked and operated in reverse.

Various forms of control systems including some of the general structural and operational features of the instant invention are disclosed in U.S. Pat. Nos. 3,362,495, 3,398,809, 3,608,662, 3,608,663, 3,861,491, 3,870,121 and 4,046,215. However, these previously known forms of steering control systems are not capable of functioning in the improved manner of the instant invention.

BRIEF DESCRIPTION OF THE INVENTION

The airboat and ground effect vehicle control system of the instant invention utilizes only a single pair of opposite side steering vanes or rudders angularly displaceable about upstanding axes and includes structure whereby the rudders may be simultaneously and substantially equally angularly displaced for basic steering operations. However, the control further includes structure whereby at any given angular position of one of the rudders, the other rudder may be relatively angularly displaced.

The rudders extend rearward of their axes of oscillation distances greater than one-half the distance between the axes of oscillation of the rudders and the rudders are not only simultaneously angularly displaceable while in parallel relation, but are also relatively angularly displaceable to positions with the rear portions of the rudders convergent toward and substantially abutting each other and with the rudders inclined between 40° and 60° relative to the longitudinal axis of the associated vehicle. When the rudders are oppositely inclined in this manner with their rear marginal edges substantially abutting, the rearward jet of air directed toward the rudders is prevented from moving pass the rudders and is instead laterally and outwardly deflected in directions inclined between 60° and 40° outwardly of the corresponding opposite sides of the associated vehicle. When the rudders are thus positioned, the vehicle may be moved in reverse and if one of the rudders is subsequently displaced toward its neutral position, the vehicle will experience a side thrust to the corresponding side of the vehicel. Of course, various different angular positions of the rudders may be utilized to effect different steering controls.

The main object of this invention is to provide a simple and effective steering, maneuvering and reversing control for air propeller driven airboats and ground effect vehicles.

Another object of this invention is to provide an improved steering control in accordance with the preceding object and which utilizes a conventional twin rudder control and incorporates a mechanism whereby the conventional twin rudder control may be operated to inversely angularly displace the rudders thereof.

A further object of this invention is to provide an air rudder control system which may be readily rectro-fitted to existing airboats and ground effect vehicles as well as incorporated into the manufacture of new airboats and ground effect vehicles.

A final object of this invention to be specifically enumerated herein is to provide an airboat and ground effect vehicle steering, maneuvering and reversing control in accordance with the preceding object and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
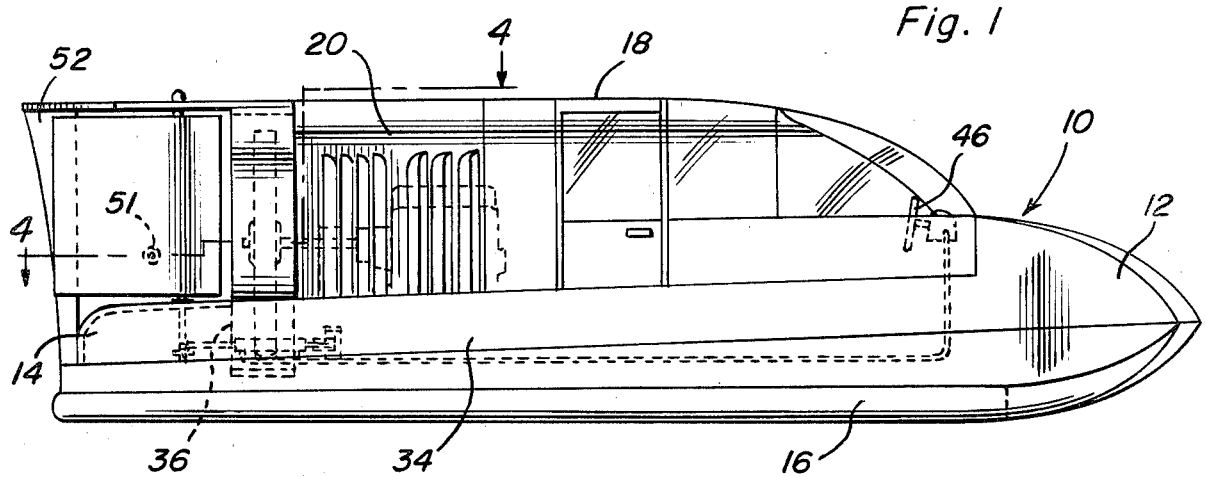
FIG. 1 is a side elevational view of a ground effect vehicle incorporating the rudder control of the instant invention.
Figure 2:
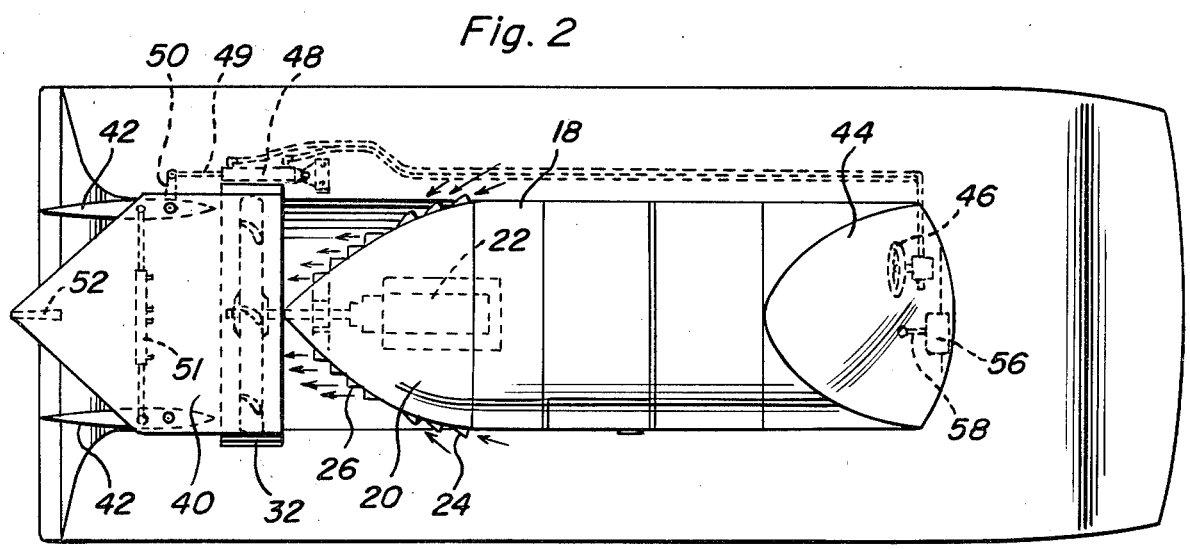
FIG. 2 is a top plan view of the assemblage illustrated in FIG. 1.
Figure 3:
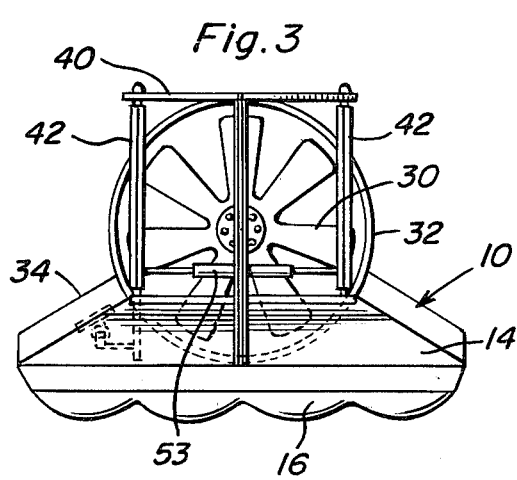
FIG. 3 is a rear elevational view of the assemblage illustrated in FIGS. 1 and 2.

Referring now more specifically to the drawings, the numeral 10 generally designates an air cushion forming ground effect vehicle including front and rear ends 12 and 14, a bottom 16 and an enclosed cabin 18. The rear of the cabin 18 defines a rearwardly tapering motor compartment 20 housing a motor 22 and including air inlet louvers 24 and air outlet louvers 26 for cooling the motor compartment 20 and the motor 22.

The motor 22 includes a rearwardly projecting power output shaft 28 having a seven-bladed fan 30 mounted thereon and the vehicle 10 includes a substantially cylindrical shroud 32 stationarily supported therefrom and in which the fan 30 is disposed.

The vehicle 10 defines a hull or body 34 from which the bottom 16 and the cabin 18 are supported and the hull or body 34 includes a forwardly opening inlet 36 disposed immediately rearward of and in alignment with the lower peripheral portion of the fan 30 for intaking a portion of the rearward jet of air from the fan 30 into the interior of the hull or body 34. The hull or body 34 includes interior structure (not shown) for ducting the air entering the inlet 36 to the bottom 16 and the bottom 16 includes air outlet means (not shown) for discharging air from the bottom 16 downwardly beneath the hull or body 34 whereby to form a supportive air cushion.

A horizontal fixed stabilizer portion 40 extends rearward from the upper portion of the shroud 32 and a pair of upstanding steering vanes 42 are supported at their upper and lower ends from the stabilizer portion 40 and the rear upper portion of the hull 34, respectively, immediately rearward of the inlet 36 for oscillation about upstanding axes fixed relative to said vehicle 10 and disposed on opposite sides of the axis of rotation of the shaft 28 and slightly inwardly of the opposite side portions of the shroud 32.

The forward portion of the interior of the cabin 18 defines an operator's position 44 and the operator's position 44 includes a steering wheel 46 comprising a part of a hydraulic steering assembly including a first rear hydraulic cylinder or motor 48 which may be extended and retracted responsive to opposite rotation of the steering wheel 46. The hydraulic cylinder 48 is pivotally anchored to the hull or body 34 and includes an extendible and retractable piston rod portion 49 operatively connected to a lever arm 50 carried by the left vane 42. Accordingly, oscillation of the steering wheel 46 is effective to oscillate the left vane 42.

An elongated connecting link 51 is pivotally connected at its opposite end to and supported solely from the the vanes 42 at points equally spaced rearward of their axes of oscillation and the connecting link 48 thereby completes a parallelogram linkage between the vanes 42 whereby extension and retraction of the piston rod 49 will equally angularly displace the vanes 42.

The rear of the stabilizer portion 40 is supported from the rear end 14 of the hull or body 34 through the utilization of a stationary center strut 52 and it may be seen from FIGS. 4 through 7 of the drawings that the connecting link 51 comprises a second reversible motor in the form of a double piston hydraulic cylinder including a pair of extendible and retractable opposite end piston rods 53 pivotally anchored to the vanes 42 at their remote ends.

Suitable hydraulic lines 54 are operatively connected to the hydraulic cylinder 51 for simultaneously extending and retracting the piston rod 53 and the hydraulic lines 54 are suitably connected to any convenient source (not shown) of hydraulic fluid through a remote control valve 56 including a manually operable control handle 58. The aforementioned source of hydraulic fluid under pressure may be powered from the motor 22.

Figure 4:
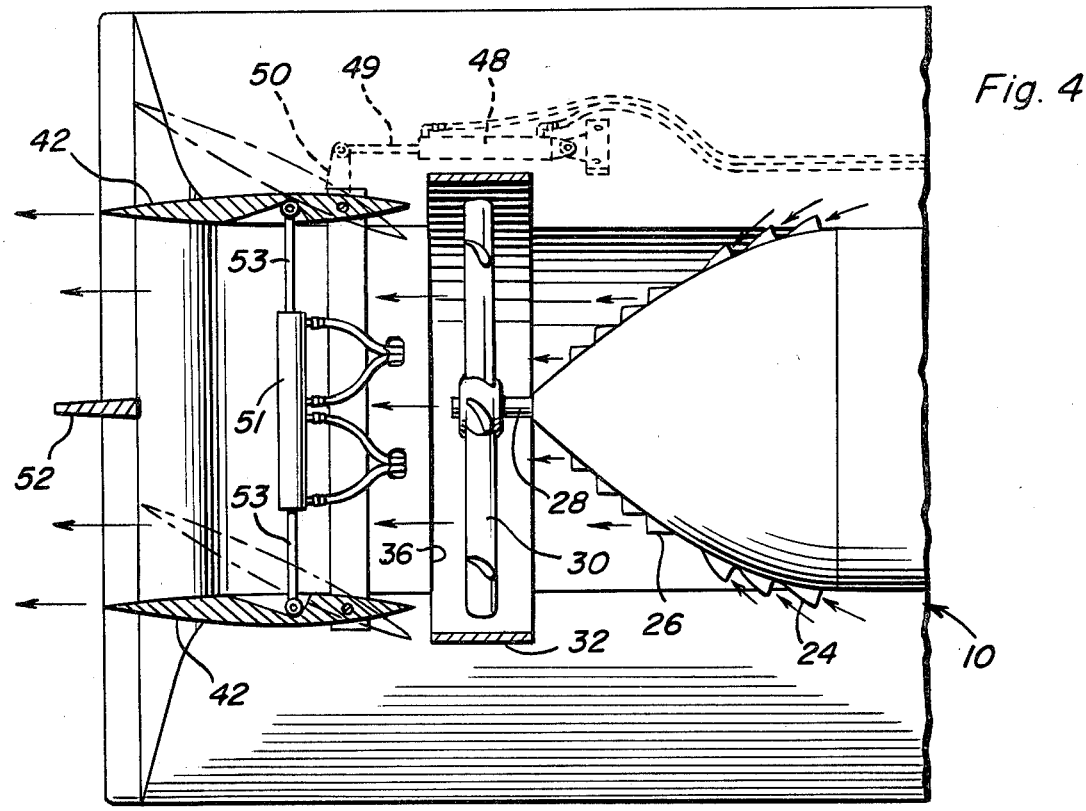
FIG. 4 is an enlarged fragmentary, horizontal sectional view taken substantially upon the plane indicated by the section line 4—4 of FIG. 1 and with the twin rudders of the control illustrated in the neutral positions thereof in solid lines and in angular positions thereof to effect a left turn in phantom lines.

When the piston rods 53 of the hydraulic cylinder 51 are extended, the vanes 42 are disposed in the parallel relation illustrated in FIG. 4 of the drawings and, accordingly, oscillation of the steering wheel 46 may be utilized for effecting steering control to the vehicle 10 while the latter is moving forward as a result of the rearward thrust developed by the propeller 30.

Figure 5:
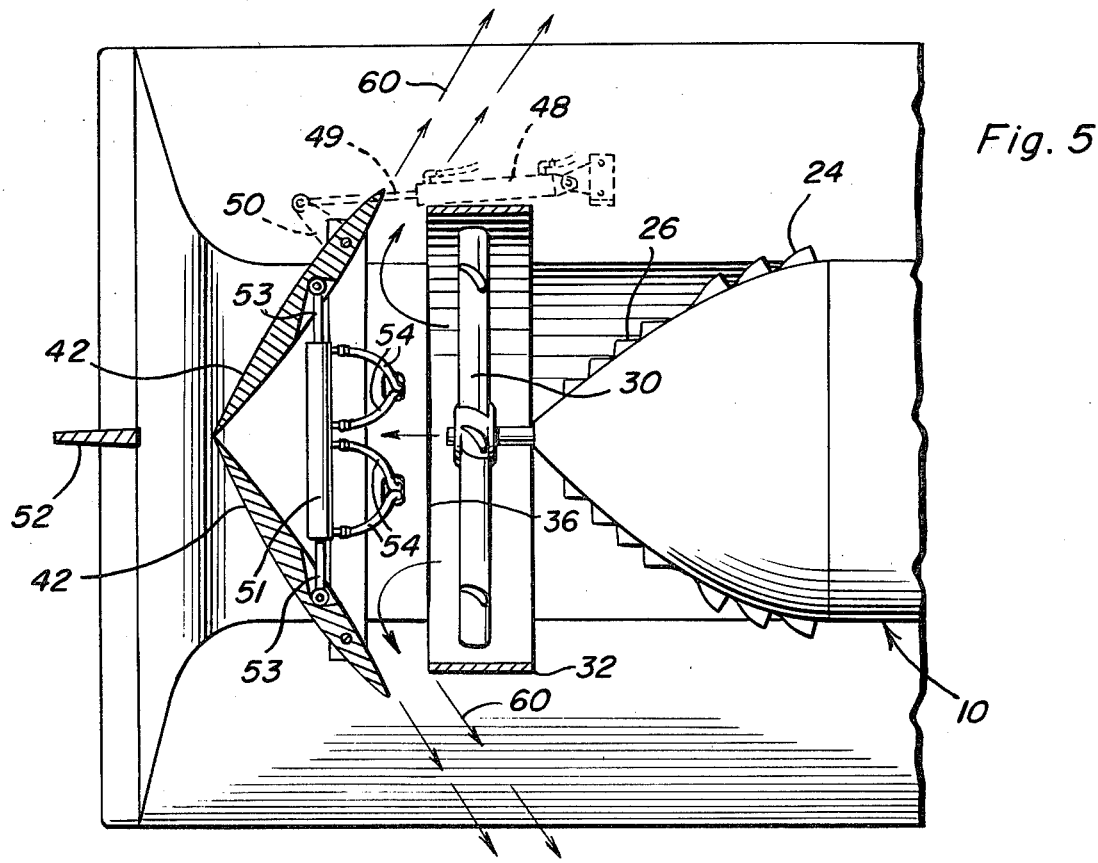
FIG. 5 is a fragmentary, horizontal sectional view similar to FIG. 5 but illustrating the twin rudders in oppositely angulated positions for effecting a reversing thrust.

If it is desired to operate the vehicle 10 in reverse, the steering wheel 46 is disposed in its neutral position and the piston rods 53 of the hydraulic cylinder 51 are retracted whereby the vanes 42 will be disposed in the rearwardly convergent and abutting positions illustrated in FIG. 5. In these positions, the rearward discharge of air from the propeller 30 is blocked from passage between the vanes 42 and instead is directed laterally outwardly from opposite sides of the vehicle 10 in forward and outward inclined directions as indicated by the arrows 60. It will be noted that when the components of the vehicle 10 are as illustrated in FIG. 5 of the drawings, the control lever 50 has been displaced to a position which would normally effect a sharp turn to the right with the right hand vane parlleling the left hand vane under the control of the control lever 50. However, when the piston rods 53 are retracted, the right hand vane 42 is oppositely inclined relative to its normal position in relation to the left hand vane 42.

Figure 6:
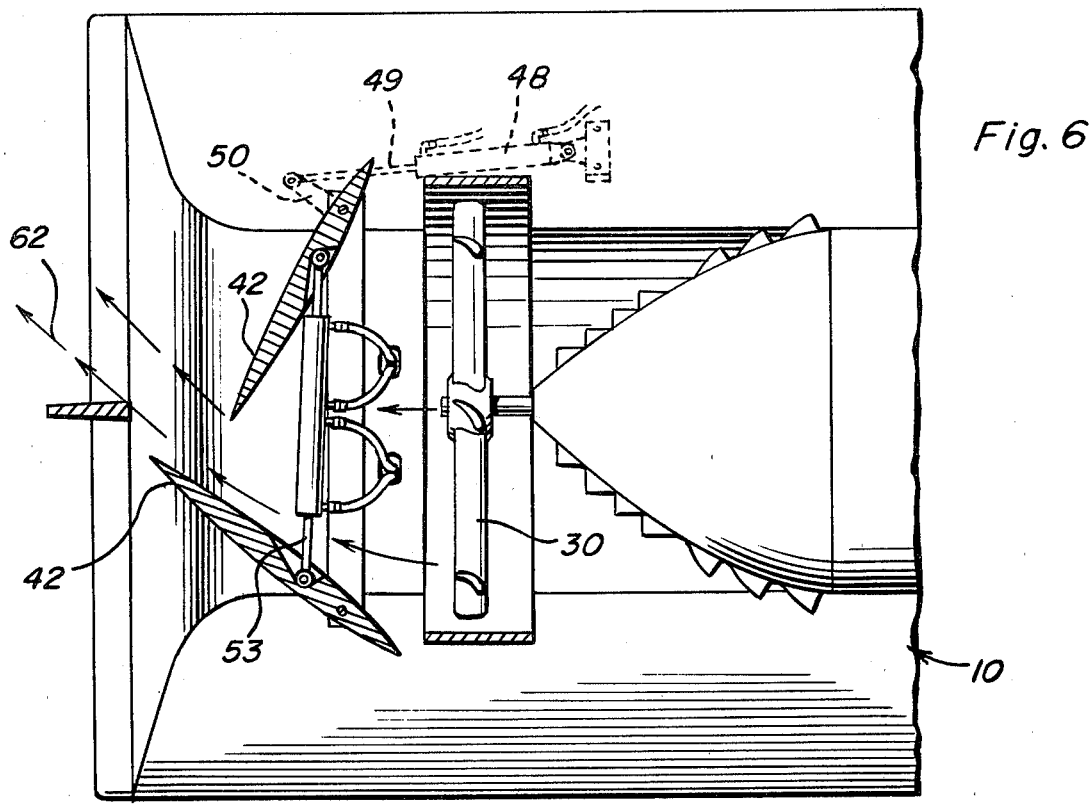
FIG. 6 is a fragmentary, horizintal sectional view similar to FIGS. 4 and 5 illustrating the twin rudders in position to effect a lateral thrust to the vehicle independent of a forward or rearward thrust.

With attention now invited to FIG. 6 of the drawings, the steering control has been actuated to pivot the left hand vane 42 to a position which would normally effect an even sharper right hand turn and the piston rods 53 of the hydraulic cylinder 51 have not been quite fully retracted. In this position sufficient discharge air from the propeller 30 flows between the rear edges of the vanes 42 and at 62 to balance the forward and rearward thrust and thus results in only a lateral thrust to the right acting upon the vehicle 10. Thus, the vehicle 10 may be substantially stationary and yet spin about its forward bow portion.

With substantially the same retraction of the piston rods 53 as that illustrated in FIG. 6, the steering control may be slightly shifted to swing the left hand vane 42 slightly toward the neutral position from the hard right hand turn position illustrated in FIG. 6 and in this manner the rearward discharge of air as at 64 will be reduced and the forward discharge of air as at 66 will be increased with the effect that the vehicle 10 will move in reverse and will be steered to the right by the lateral thrust effected by the angular discharge of air as at 64.

Figure 7:
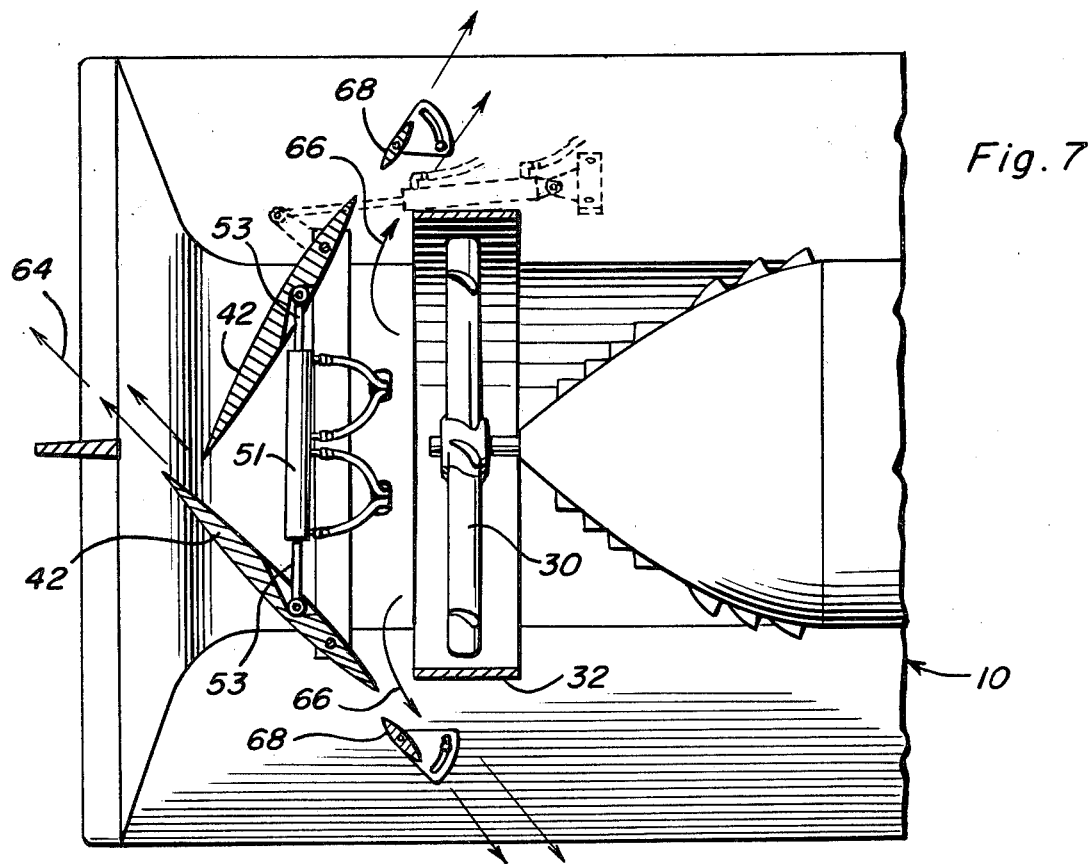
FIG. 7 is a fragmentary, horizontal sectional view similar to FIG. 4 illustrating the twin rudders in oppositely angulated positions to effect steering control when operating in reverse, FIG. 7 also illustrating stationary adjustable supplemental vanes.

In addition, from FIG. 7 of the drawings, it may be seen that supplemental vanes 68 supported from the hull 34 and a slightly wider stabilizer portion may be provided. The vanes 68 are stationary but may be angularly adjusted as desired and the vanes 68 may be fitted to the vehicle 10 in order to enable more efficient control of the vehicle 10 when the vanes 42 thereof are positioned in the various positions illustrated in FIGS. 5, 6 and 7.

Figure 8:
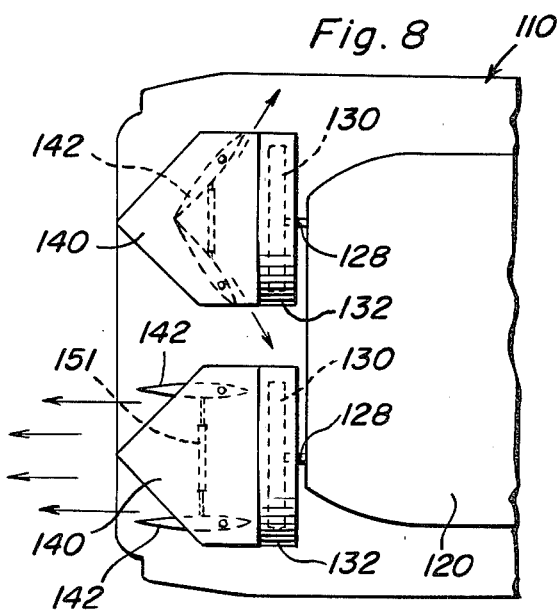
FIG. 8 is a fragmentary top plan view of a modified form of ground effect vehicle illustrating the manner in which the control of the instant invention may be utilized in conjunction with a twin propeller driven ground effect vehicle.

With attention now invited more specifically to FIG. 8 of the drawings, there may be seen a modified form of vehicle referred to in general by the reference numeral 110. The vehicle 110 is substantially identical to the vehicle 10 except that the vehicle 110 is slightly wider and includes a motor compartment 120 housing a pair of side-by-side motors (not shown) including parallel power output shafts 128. Each of the output shafts 128 has a propeller 130 mounted thereon and each of the propellers 130 has a pair of vanes 142 corresponding to the vanes 42 operatively associated therewith. In addition, the vehicle 110 includes a pair of stabilizer portions 140 corresponding to the stabilizer portion 40 and each pair of vanes 142 is operably connected through the utilization of a connecting link 151 corresponding to the connecting link 51.

The stabilizer 40 and the stabilizers 140 serve to prevent upward escape of air from between the vanes 42 when the latter are disposed in rearward convergent positions, the downward escape of air being prevented by the upper surfaces of the rear portion 14 of the hull of the vehicle 10.

Although the vanes 42 are illustrated and described herein only in operative association with the ground effect vehicle 10, it is to be understood that the vanes 42 also may be used in conjunction with various other forms of fluid propelled vehicles such as jet boats, air boats, propeller aircraft, fan jet aircraft and jet aircraft, as structure is included for preventing upward or downward escape of the fluid stream deflected by the vanes 42, which equivalent structure of the vehicle 10 is represented by the stabilizer 40 and the upper surfaces of the rear portion 14 of the hull of the vehicle 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle to be propelled by a rearward discharge of fluid therefrom and including fluid jet developing means for discharging a rearward jet of fluid along a predetermined path, a steering, reversing and forward aggregate thrust nullifying control means including a pair of upstanding steering vanes mounted from said vehicle for oscillation about upstanding axes spaced transversely apart and disposed on opposite sides of the center line of said path and fixed relative to said vehicle, said control means including means operative to simultaneously similarly angularly displace said vanes about said axes, said vanes extending rearward of said axes distances greater than one-half the distance between said axes, said control means including first remotely operable and reversible motor means connected betwen said vehicle and one vane operative, only, to selectively angularly displace said one vane about its axis of oscillation relative to said vehicle and parallelogram link means supported solely from and connected between said vanes for substantially simultaneously and equally angularly displacing the other vane about its axis of oscillation relative to said vehicle responsive to angular displacement of said one vane by said first motor means, said parallelogram link means including second remotely operable and reversible motor means operative to vary the effective length of said link means whereby to effect angular displacement, only, of said other vane relative to said vehicle and one vane.

2. The combination of claim 1 wherein said vanes also project forward of said axes.

3. The combination of claim 2 wherein the distances said vanes project forward of said axes is less than the distances said vanes extend rearward of said axes.

4. The combination of claim 1 wherein said link means is connected between said vanes rearward of the axes of oscillation thereof.

5. The combination of claim 4 wherein said vehicle comprises a ground effect vehicle including an air inlet for supplying air cushioned air to the underside of said vehicle, said inlet being disposed immediately rearwardly of said fluid jet developing means and extending at least partially across and in registry with the lower portion of said jet of fluid, said link means being connected between the lower portions of said vanes rearward of said air inlet.

6. The combination of claim 5 wherein said vanes also project forward of said axes.

7. The combination of claim 6 wherein the distances said vanes project forward of said axes is less than the distances said vanes extend rearward of said axes.

8. The combination of claim 1 wherein said vehicle includes only single means for discharging a single rearward jet of fluid along said predetermined path and a single pair of upstanding steering vanes operatively associated with said path.

9. The combination of claim 1 wherein said vehicle includes a pair of fluid jet developing means for discharging two rearward jets of fluid along predetermined parallel paths, each of said fluid paths having a pair of said steering vanes operably associated therewith.

* * * * *